United States Patent
Bierwas et al.

(10) Patent No.: US 9,591,860 B2
(45) Date of Patent: Mar. 14, 2017

(54) PRESERVATIVE COMPOSITION AND SOLUTION

(71) Applicant: Orgacure Holding B.V., Rotterdam (NL)

(72) Inventors: Roger Bierwas, Rotterdam (NL); Julian Willem Vrolijk, Hamburg (DE); Jan Paul Schirmer, Hamburg (DE)

(73) Assignee: Orgacure Holding B.V., Roterdam (NL)

( * ) Notice: Subject to any disclaimer, the term of this patent is extended or adjusted under 35 U.S.C. 154(b) by 0 days.

(21) Appl. No.: 14/761,042

(22) PCT Filed: Jan. 15, 2014

(86) PCT No.: PCT/NL2014/050013
§ 371 (c)(1),
(2) Date: Jul. 15, 2015

(87) PCT Pub. No.: WO2014/112868
PCT Pub. Date: Jul. 24, 2014

(65) Prior Publication Data
US 2015/0351419 A1 Dec. 10, 2015

(30) Foreign Application Priority Data
Jan. 15, 2013 (NL) ...................................... 2010127

(51) Int. Cl.
| A23L 3/3454 | (2006.01) |
| A23B 7/10 | (2006.01) |
| B65D 30/10 | (2006.01) |
| A23L 3/3463 | (2006.01) |
| A23B 7/154 | (2006.01) |

(52) U.S. Cl.
CPC ................ *A23B 7/10* (2013.01); *A23B 7/154* (2013.01); *A23L 3/3463* (2013.01); *A23L 19/00* (2016.08); *B65D 31/16* (2013.01); *A23V 2002/00* (2013.01)

(58) Field of Classification Search
CPC ...... A23L 3/3463; A23L 1/212; A23L 1/3463; A23B 7/10; A23B 7/54; B65D 31/16; A23V 2002/00
USPC ....... 426/615, 102, 110, 271, 321, 326, 335, 426/541, 72, 74
See application file for complete search history.

(56) References Cited

U.S. PATENT DOCUMENTS

| 4,975,293 | A | 12/1990 | Hicks et al. |
| 4,988,522 | A | 1/1991 | Warren |
| 5,945,146 | A | 8/1999 | Twinam |
| 9,044,045 | B2 * | 6/2015 | Brown .................. A23B 7/157 |
| 2012/0269942 | A1 | 10/2012 | Hekal |

FOREIGN PATENT DOCUMENTS

| CN | 101112208 A | 1/2008 |
| EP | 0316293 A1 | 5/1989 |
| EP | 1010368 A1 | 6/2000 |
| GB | 2292563 A | 2/1996 |
| WO | 94/12041 A1 | 6/1994 |
| WO | 97/23138 A1 | 7/1997 |
| WO | 99/07230 A1 | 2/1999 |
| WO | 02/03809 A1 | 1/2002 |

OTHER PUBLICATIONS

A.M.C.N. Rocha, et al., "Influence of Chemical Treatment on Quality of Cut Apple (cv. Jonagored)", Journal of Food Quality 21 (1998), pp. 13-28.
Charles R. Santerre, et al., Ascorbic/Citric Acid Combinations in the Processing of Frozen Apple Slices, Journal of Food Science, vol. 53, No. 6, 1988, p. 1713-1717.
Office Action dated Oct. 14, 2016 from the Chinese Patent Office for a counterpart foreign application.

* cited by examiner

*Primary Examiner* — Helen F Heggestad
(74) *Attorney, Agent, or Firm* — Hoffmann & Baron, LLP

(57) ABSTRACT

A preservative composition includes a source of ascorbate or erythorbate ions, or a mixture thereof, a source of calcium ions and one or more food grade sequestrants, wherein the molar ratio of ascorbate or erythorbate ions, or a mixture thereof, to calcium ions is of from 0.5:1 to 1.4:1.

26 Claims, No Drawings

PRESERVATIVE COMPOSITION AND SOLUTION

CROSS-REFERENCE TO RELATED APPLICATIONS

This application is the National Stage of International Application No. PCT/NL2014/050013 filed Jan. 15, 2014, which claims the benefit of Netherlands Application No. 2010127, filed Jan. 15, 2013, the contents of which is incorporated by reference herein.

TECHNICAL FIELD

The present invention is related to a preservative composition, a preservative solution comprising said composition, a method for preserving fruit and vegetables and the use of such a composition or solution.

BACKGROUND ART

Preservative compositions for the preservation of produce, i.e. fruit and vegetables, are known in the art. Preservation treatments can be applied on whole fruits and vegetables, e.g. as a post-harvest treatment, but also to preserve the quality of peeled, sliced or cut fruits or vegetables. The latter gain in importance as the demand for convenience food increases. For example, freshly cut apple slices turn brown and soggy within hours. By treating fruit or vegetables with a preservative composition, their so-called shelf life can be extended considerably.

An important aspect of preservative compositions is the taste they impart on the products they are applied upon. Ideally, preservative compositions do not alter the taste. In practice, a preservative composition may be a compromise between preservation and taste altering properties. A related aspect is that as a food product, the ingredients of a preservative composition fall under strict regulations. This means that not every compound or composition that shows good preservation properties is suitable for use as a preservative composition.

In respect of the above, WO9907230 discloses a method for preserving fresh fruit, in which a preservative solution is employed comprising ascorbate ions and calcium ions in an ion ratio of from 1.5:1 to 2.5:1. About the taste of preservatives or preservative compositions, WO9907230 mentions that fruit that is treated with citric acid, has a sour taste, becomes soft and soggy and usually turns brown within hours. Therefore, it is stated that a preservative composition should preferably lack citric acid. Further, a preservative composition A comprising 2 grams ascorbic acid, 4 grams calcium chloride, 2 grams citric acid, and 4 grams sodium acid pyrophosphate in 188 ml distilled water was used as a comparative preservative solution in the preservation of red delicious apple slices. This means that the molar ratio of ascorbate ions to calcium ions in preservative composition A is 0.31:1. The taste after treatment was assessed as very strong and considered unacceptable.

DESCRIPTION OF THE INVENTION

Surprisingly, the inventors found that a preservative composition comprising a source of ascorbate or erythorbate ions, or a mixture thereof, a source of calcium ions and one or more food grade sequestrants, of which citric acid is an example, having a molar ratio of ascorbate or erythorbate ions, or a mixture thereof, to calcium ions of from 0.5:1 to 1.4:1, preferably of from 0.7:1 to 1.2:1, more preferably of from 0.8:1 to 1.1:1, does not impart an unpleasant taste or after taste on treated fruit and vegetables. The preservative composition according to the invention also contains from 1 to 40 wt. % of an alkaline carbonate or bicarbonate salt and from 1 to 20 wt. % of a reducing agent, selected from the group consisting of a metabisulfite salt, cysteine and one of its amino acid derivatives, all percentages based on the weight of the total composition. Even after 10 days, the treated fruit and vegetables still had a pleasant taste. In addition, the fruit and vegetables that are treated with a preservative composition according to the invention do not exhibit any noticeable browning, have a pleasant smell, i.e. they smell as a person would expect from a particular fruit or vegetable; and the treated fruit and vegetables maintain, at least to a large extent, their texture and firmness.

In the preservative composition according to the invention, the source of ascorbate ions may be ascorbic acid, an ascorbate salt or a mixture of both, and the source of erythorbate ions may be erythorbic acid, an erythorbate salt or a mixture of both. When the source of ascorbate or erythorbate ions is a salt, it is preferably selected from the group consisting of calcium ascorbate, magnesium ascorbate, potassium ascorbate, sodium ascorbate, calcium erythorbate, magnesium erythorbate, potassium erythorbate, sodium erythorbate, and mixtures thereof. In a preferred embodiment, the source of ascorbate ions is ascorbic acid and the source of erythorbate ions is erythorbic acid, or a mixture of both.

The present preservative composition comprises a source of calcium ions. Preferably, the composition comprises calcium ions in an amount of from 0.5 to 20, more preferably of from 1 to 15, even more preferably of from 2 to 10 wt. %, based on the total composition. Suitable examples of such a calcium source are those selected from the group consisting of calcium hydroxide, calcium chloride, calcium carbonate, calcium bicarbonate, calcium phosphate, calcium erythorbate, calcium acetate, calcium gluconate, calcium glycerophosphate, calcium lactate, calcium ascorbate, and mixtures thereof. Preferably, the source of calcium ions is calcium chloride.

The present preservative composition further comprises one or more food grade sequestrants. Suitable examples of such sequestrants are those selected from the group consisting of acetic acid, citric acid, fumaric acid, lactic acid, malic acid, glutamic acid, gluconic acid, succinic acid, tartaric acid and the salts of these acids, EDTA and its salts, phosphate salts, polyphosphates, bisulfate salts, and mixtures thereof. Preferably, the food grade sequestrant is citric acid.

The amount of food grade sequestrant present in the preservative composition may be of from 5 to 80, preferably of from 10 to 50, more preferably of from 12 to 40, most preferably of from 15 to 35 wt. %, based on the total weight of the composition. Advantageously, the molar ratio of ascorbate or erythorbate ions to the total number of moles of food grade sequestrant present in the preservative composition is smaller than 1.

In one embodiment of the present invention, the preservative composition is essentially free of magnesium ions.

In addition to the above constituents, the present composition may further comprise a filler material, preferably selected from the group consisting of cellulose, e.g. methylcellulose or one of its derivatives, lactose, dextrose, mannitol, sorbitol, maltitol, steviol glycosides, e.g. rebaudioside A, xylitol, and mixtures thereof. Said filler material may be present in the preservative composition in an amount of from 1 to 75, preferably 10 to 60, more preferably of from 15 to 40 wt. %, based on the total weight of the composition.

The preservative composition may further comprise of from 0.01 to 5, preferably 0.5 to 2 wt. %, based on the total composition, of one or more food grade antimicrobial agents, preferably 4-hexylresorcinol.

The preservative composition according to the invention may yet further comprise a pH buffering system. Such a buffer system may be provided by incorporating one of the above acidic food grade sequestrants, i.e. one or more so-called organic acids selected from the group consisting of acetic acid, citric acid, fumaric acid, lactic acid, malic acid, glutamic acid, gluconic acid, succinic acid and tartaric acid, in combination with their conjugate base salts. Another suitable buffer system is formed by phosphoric acid combined with sodium, potassium or calcium phosphate. Preferably, the composition comprises one or more of said organic acids and a citrate salt, preferably potassium citrate, in an amount of from 0.1 to 5, preferably of from 1 to 4 wt. %, based on the total composition.

The preservative composition further comprises from 1 to 20, preferably of from 2 to 10 wt. %, based on the total composition, of a reducing agent, selected from a metabisulfite salt, or cysteine or one of its amino acid derivates, more preferably sodium metabisulfite. The presence of at least one of these sulfur-containing reducing agents has an antimicrobial sanitizing effect. It counteracts the growth of microbes that may contaminate the fresh produce. In that respect the preservative composition according to the present invention has a significant advantage over the composition described in US 2012/0269942 that discloses a preservative composition containing calcium and ascorbate ions wherein the calcium to ascorbate a molar ratio is more than 1.0. In order to prevent microbes from contaminating the food, a low pH is required. However, a really low pH is detrimental to the preservation performance. These drawbacks do not occur in the composition according to the present invention. The preservative compositions of the present invention allow for low-sulfur preservative solutions. Such solutions reduce health risks for people who are sensitive of sulfur, thereby allowing them to eat food without the risk of an allergic reaction. The low-sulfur solutions also improve organoleptic properties of the treated food, such as taste. It is known that there is a tendency to replace sulfur-containing ingredients. However, by the composition according to the present invention there is no need to refrain from using such sulfur-containing ingredients, since the effective preservation composition allows for minute residues on the treated food, thereby benefiting from the antimicrobial effect of the sulfur-containing ingredient, and at the same time avoiding the drawbacks of such sulfur-containing ingredients.

The preservative composition further comprises from 1 to 40, preferably of from 5 to 30 wt. %, based on the total composition, of an alkaline carbonate or bicarbonate salt, preferably sodium bicarbonate. The alkaline carbonate or bicarbonate can be any alkali metal or alkaline earth metal salt. As indicated above, the carbonate may preferably be calcium carbonate. The presence of carbonate salts reduces the hygroscopic nature of the preservative composition. Especially when also bicarbonate salts are present in the composition it is desirable to keep the composition dry in order to prevent carbon dioxide from being released. The use of calcium carbonate as source for the calcium ions has therefore increased the shelf life of the composition according to the invention considerably. Calcium carbonate could at least partially replace other calcium sources, such as calcium chloride. It could also be used in complete or partial replacement of a bicarbonate salt, such as sodium bicarbonate. If the latter would be accomplished, the number of active ingredients in the preservative composition according to the present invention can be reduced, which facilitates its manufacturing process. Moreover, the replacement by calcium carbonate may reduce the amount of sodium in the preservative composition, which may have a beneficial effect on people that suffer from heart and vascular diseases. It is evident that the presence of carbonate and/or bicarbonate salts represent considerable advantages. The preservative composition according to the present invention therefore is advantageous over the compositions disclosed in WO 94/12041. Although the compositions shown in WO 94/12041 comprise ascorbic acid, calcium, and sodium disulfite, they do not contain any carbonate or dicarbonate salt. As calcium source calcium chloride is used, which is hygroscopic and entails a relatively short shelf life. By the presence of a carbonate or bicarbonate the shelf life is extended.

The present preservative composition can be prepared by combining and mixing the ingredients.

In a certain embodiment, the ingredients can be mixed and subsequently converted into granules. To this end enough water is added to agglomerate the ingredients, after which the water is removed from the mixture, e.g. by freezing and depressurizing the agglomerated mixture. Thus prepared mixtures are more stable towards demixing, e.g. during transport.

Although the preservative composition according to the present invention is particularly suitable for preserving fruit and vegetable, which may be peeled or unpeeled, sliced or unsliced, the preservative composition may also be used for the preservation of other foodstuff. A suitable other foodstuff may, for instance, be meat such as pork, beef, poultry, game, as well as fish products, such as raw fish, shell fish, crustaceans and the like.

In yet another embodiment of the present invention, the preservative composition comprises of from 0.1 to 10, preferably of from 1 to 8 wt. %, based on the total composition, of one or more cyclodextrins. Cyclodextrins have the ability to form solid host-guest complexes with e.g. gaseous compounds. In these complexes, a gas molecule, i.e. the guest, is held within the cavity of the cyclodextrin host molecule. This ability to capture gaseous molecules is useful in capturing ethylene molecules that are released in the ripening process of fruits and vegetables. Ethylene is not only produced by the ripening of fruits and vegetables, it is also believed to increase ripening and maturing of fruit and vegetables. By capturing the ethylene molecules, the ripening and maturing process is retarded, hence increasing the shelf life of fruit and vegetables. In addition, the cyclodextrin molecules can capture gaseous molecules that may be released from the preservative composition. For instance, the cyclodextrin molecules can capture the, usual small, amounts of carbon and sulfur dioxide that may be released as a result of the reaction between carbonates or sulfates, and citric acid. Preferably, the cyclodextrin is beta-cyclodextrin.

In a preferred embodiment of the present invention, the preservative composition comprises:

i. from 4 to 20, preferably of from 5 to 15 wt. % of ascorbic acid;

ii. from 4 to 20, preferably of from 5 to 15 wt. % of calcium chloride;

iii. from 5 to 30, preferably of from 10 to 25 wt. % of citric acid;

iv. from 5 to 50, preferably of from 10 to 40 wt. % of lactose or dextrose;

v. from 1 to 30, preferably of from 5 to 20 wt. % of sodium bicarbonate;

vi. from 0.1 to 10, preferably of from 1 to 8 wt. % of sodium metabisulfite;

vii. from 0.1 to 5, preferably of from 1 to 4 wt. % of potassium citrate;

The composition further optionally comprises of from:

viii. from 0.1 to 10, preferably of from 1 to 10 wt. % of beta-cyclodextrin;

ix. from 0.01 to 5, preferably of from 0.5 to 2 wt. % of 4-hexylresorcinol;

x. from 0.1 to 10, preferably of from 1 to 8 wt. % of sodium acid sulfate;

all amounts based on the total weight of the composition.

As indicated above, the calcium chloride may suitably be at least partially replaced by calcium carbonate. The requirement of the molar ratio of ascorbate and/or erythorbate ions to calcium ions needs to be fulfilled.

Another aspect of the invention is related to a preservative solution comprising the current preservative composition and water. Although the preservative composition according to the invention can be applied to fruits or vegetables as such, it can also be employed in the form of a solution. An advantage of employing a solution is that the ingredients in the preservative composition can be more uniformly spread over the fruits and vegetables.

The water used for the preservative solution may be tap water, but can also be distilled water, spring water, rain water or electrolyzed water. The latter is e.g. obtained by electrolyzing sodium chloride containing water, which creates a solution of sodium hypochlorite. The solvent may also be a mixture of water and alcohol, e.g. a 5 vol. % solution of alcohol in water. Advantageously, the water is sanitized, preferably before the preservative composition is added. The skilled person is well aware of how to sanitize water and what sanitizing agents can be used. Suitable examples of sanitizing agents are hydrogen peroxide, chlorine, chlorine dioxide, sodium hypochlorite, ozone, and mixtures thereof. Typically, the amount of sanitizing agent employed is of from 0.5 to 1.5 wt. %, based on the total weight of the solution.

Advantageously, the pH of the preservative solution is of from 2 to 7, preferably of from 3 to 5. Preferably, the desired pH is reached after the preservative composition has been added and allowed to dissolve. In that case, pH adjustment is unnecessary. It is also possible to adjust the pH of the preservative solution using one or more of the pH-adjusting agents known in the art, e.g. sodium hydroxide or hydrochloric acid.

Preferably, the combined amounts of calcium ions, ascorbate and/or erythorbate ions and the one or more food grade sequestrant in the preservative solution range of from 0.1 to 10, preferably of from 0.5 to 5, more preferably of from 1 to 3 grams per liter water.

In a particular embodiment of the present invention, the preservative solution comprises of from 0.005 to 5, preferably of from 0.01 to 2, more preferably of from 0.02 to 1 wt. % of calcium ions and 0.005 to 10, preferably of from 0.01 to 5, more preferably of from 0.02 to 1 wt. % of ascorbate and/or erythorbate ions. Preferably, the source of calcium ions is calcium chloride. Preferably the source of ascorbate or erythorbate ions is ascorbic and/or erythorbic acid. The molar ratio of ascorbate or erythorbate ions, or mixtures thereof, to calcium ions should be of from 0.5:1 to 1.4:1.

According to another embodiment of the present invention, the preservative solution comprises of from 2 to 20, preferably of from 4 to 15, more preferably of from 5 to 10 grams per liter water of a preservative composition comprising:

i. from 4 to 20, preferably of from 5 to 15 wt. % of ascorbic acid;

ii. from 4 to 20, preferably of from 5 to 15 wt. % of calcium chloride;

iii. from 5 to 30, preferably of from 10 to 25 wt. % of citric acid;

iv. from 5 to 50, preferably of from 10 to 40 wt. % of lactose or dextrose;

v. from 1 to 30, preferably of from 5 to 20 wt. % of sodium bicarbonate;

vi. from 0.1 to 10, preferably of from 1 to 8 wt. % of sodium metabisulfite;

vii. from 0.1 to 5, preferably of from 1 to 4 wt. % of potassium citrate;

The composition further optionally comprises of from:

viii. from 0.1 to 10, preferably of from 1 to 10 wt. % of beta-cyclodextrin;

ix. from 0.01 to 5, preferably of from 0.5 to 2 wt. % of 4-hexylresorcinol;

x. from 0.1 to 10, preferably of from 1 to 8 wt. % of sodium acid sulfate;

all amounts based on the total weight of the composition.

As indicated above, the calcium chloride may suitably be at least partially replaced by calcium carbonate. The requirement of the molar ratio of ascorbate and/or erythorbate ions to calcium ions needs to be fulfilled.

The preservative solution according to invention can be prepared by adding a certain amount of preservative composition to the solvent. Alternatively, but less preferred, the ingredients making up the preservative composition can be added separately to the solvent.

Yet another aspect of the invention is related to a product holder comprising the preservative composition or preservative solution. The preservative composition can be packed in suitable product holders such as drums, cans, boxes or bags, having a capacity of e.g. 1, 5 or 10 kg. Such product holders can suitably be deployed when treating bulk quantities of fruits and vegetables, e.g. in hotels or restaurants, or in a post-harvest treatment of tomatoes or potatoes. In the latter case, the contents of the product holders can e.g. be added to a tank of water, after which the tomatoes or potatoes can be sprayed with or immersed in the thus formed preservative solution. Another possibility is to prepare a preservative solution according to the invention and pack this in suitable product holder, e.g. a drum or jerry can, e.g. a 10 liter jerry can.

The preservative composition can also be packed in bags, pouches or sachets, having a capacity of e.g. 5 or 10 grams. Such pouches or sachets can for instance be used in supermarkets or greengroceries. They can even be sold in combination with fruits or vegetables, thereby providing an easy to use means of preservation at home. The contents of such a pouch or sachet can then be added to a prescribed volume of water, after which the freshly cut fruits or vegetables can be contacted with the thus formed preservative solution. This not unlike the way freshly cut flowers are treated when putting them in a vase. Alternatively, the pouches or sachets contain the preservative solution, preferably in the form of a gel. Another option is to provide the bag, pouch or sachet with an inside coating comprising the preservative composition. Such a coating can e.g. be cellulose-based. Upon adding water, the coating is dissolved and the fruit or vegetable is directly enveloped by the preservative solution. To allow rapid dissolution, the coating should have thickness in the μm range, e.g. 1 to 500 μm. Advantageously, the preservative composition or preservative solution is contained in a resealable or reclosable product holder.

In an advantageous embodiment of the present invention, the preservative composition is contained in a so-called doypack, which is a bag, pouch or sachet that is designed to stand upright. Preferable, the doypack is resealable. The doypacks may contain of from 5 to 250 grams of the preservative composition according to the invention. Such a doypack is typically employed by adding water to the contents of the opened, optionally resealable, doypack, thus dissolving the powdery preservative composition present in the doypack. Then, freshly cut fruit or vegetable, e.g. a sliced apple, is put in the doypack. The doypack is then shaken until the preservative solution is evenly spread over the slices. Thus prepared fruits or vegetables are ready for consumption and remain so up until 12 hours after preparation without cooling. In these 12 hours, no browning or other deterioration of the fruits or vegetables is observed. When placed in a cooler, either in the closed doypack or in another suitable storage means, the prepared fruits or vegetables can be stored up to 10 days without losing their taste, smell, firmness and texture, and without showing any noticeable browning or other deterioration. Upon filling a product holder with preservative composition or preservative solution, it is preferably stored under a dry, dark and cool atmosphere, e.g. in a cooling cell at a temperature between 10 and 15° C.

Another aspect of the invention is related to a method for preserving fruits or vegetables, comprising combining the ingredients of the preservative composition and contacting the fruits or vegetables with the preservative composition. More particular, the method comprises the steps of:

a) combining and mixing the ingredients of the preservative composition;

b) preparing a preservation solution by adding the preservative composition to a suitable solvent;

c) treating the fruits or vegetables with the preservation solution by contacting them for a predetermined amount of time.

Such a method may optionally comprise the step of:

d) storing the treated fruit and vegetables at a temperature between 1 and 12, preferably between 4 and 10° C.

In step b), the solvent is as defined above for the preservation solution. Preferably, the solvent is water at a temperature of from 13 to 20° C.

In step c), the fruits and vegetables are preferably contacted with the preservation solution by spraying or nebulizing the solution over the fruits or vegetables or by immersing the fruits or vegetables in the preservation solution.

Before storing the treated fruits or vegetables in step d), they may be packed, e.g. in a resealable polyethylene bag. This is particularly advantageous when the fruits or vegetables are in the form of freshly cut parts or slices, e.g. cucumber parts.

In a particular embodiment of the present invention, the method is applied to freshly harvested fruits or vegetables. To this end, the products, e.g. tomatoes, are harvested in crates or boxes and transported to a shed or other building. This shed is equipped with a sprinkler system, which is used to spray the products with the present preservative solution. The solution can be sprayed as such, but it can also be sprayed in atomized or nebulized form or as an aerosol.

The nature of the fruits or vegetables that can be treated with the present preservative composition or preservative solution is by no means limited. Examples of fruits that can suitably be treated with the present preservative composition or preservative solution are apples, pears, kiwis, melons, pineapples, bananas, peaches, etc. Examples of vegetables that can suitably be treated with the present preservative composition or preservative solution are cucumbers, radishes, tomatoes, peppers, cauliflowers, onions, potatoes, chicory, lettuce, herbs, etc. The fruits and vegetables can be treated as such, but can also be applied to peeled, cut and/or sliced fruit and vegetables. In particular, the present preservative composition or preservative solution is applied to freshly cut apple slices.

The present preservative composition or preservative solution can be used in the preservation of fruits and vegetables. The preservative composition or solution can also be used in the sanitization of fruits and vegetables. In the present context, preservation means retarding the maturing and ripening processes of harvested fruit and vegetables. Sanitization means the destruction of pathogenic and other kinds of microorganisms. Usually, fruits and vegetables are sanitized before being preserved. In the context of the present invention, fruits and vegetables may be sanitized and preserved in a one-step treatment. The present preservative composition or preservative solution can also be used as in the direct post-harvest treatment of fruits and vegetables. As such, the preservative composition or preservative solution has the purpose of rinsing the products and sanitizing and preserving them. The preservative composition or preservative solution of the present invention can further be used as a pesticide, i.e. a so-called low-risk pesticide. In this case, the preservative composition or preservative solution is applied to growing fruits and vegetables. The preservative composition or preservative solution of the present invention can yet further be used as a plant tonic, i.e. as a means to strengthen plants and improve their growth.

EXAMPLES

The invention is now illustrated by means of the following example.

Example 1

100 grams of preservative compositions I and II were prepared by mixing the ingredients in the proportions as listed in table 1.

TABLE 1

Formulation of preservative compositions I to II

| | Preservative composition | | | |
| --- | --- | --- | --- | --- |
| | I | | II | |
| Ingredient | g/100 g | mol/100 g | g/100 g | mol/100 g |
| Lactose | 37.70 | 0.110 | — | — |
| D-glucose monohydrate (dextrose) | — | — | 37.70 | 0.209 |
| Sodium bicarbonate | 19.50 | 0.232 | 19.50 | 0.232 |
| Citric acid (anhydrous) | 16.25 | 0.085 | 16.25 | 0.085 |
| Ascorbic acid | 11.10 | 0.063 | 11.05 | 0.063 |
| Calcium chloride dihydrate | 8.50 | 0.058 | 9.30 | 0.063 |
| Sodium metabisulfite | 5.00 | 0.026 | 5.00 | 0.026 |
| Potassium citrate monohydrate | 1.20 | 0.004 | 1.20 | 0.004 |

TABLE 1-continued

Formulation of preservative compositions I to II

| | Preservative composition | | | |
|---|---|---|---|---|
| | I | | II | |
| Ingredient | g/100 g | mol/100 g | g/100 g | mol/100 g |
| Magnesium chloride hexahydrate | 0.75 | 0.004 | — | — |
| Total | 100 | 0.605 | 100 | 0.703 |

Table 2 lists the molar ratio of ascorbate ions to calcium ions in preservative compositions I and II.

TABLE 2

Molar ratio of Ascorbate ions to Calcium ions

| Solution | Ascorbate: Ca2+ |
|---|---|
| I | 1.09:1 |
| II | 0.99:1 |

Freshly cut slices of Royal Gala apples ('samples') were treated with the preservative compositions according to the following procedure.

Preservation solutions were prepared by mixing 21 grams of the preservative compositions I and II with 3 liters of tap water. The apple slices were subsequently dipped into the preservation solution for 90 seconds. The apple slices were also dipped for 90 seconds in a control solution C containing only tap water. Afterwards, the slices were stored at a temperature between 5 and 8° C. The taste of the slices was assessed after 1, 4, 6, 8 and 10 days. A score of from 0 to 10 with half point increments was awarded. The scores were weighted as follows:
>8—tastes freshly cut
>6-≤8—good
>5-≤6—not good, but acceptable
≤5—unacceptable
The test result are shown in table 3.

TABLE 3

Sliced Apple Test Results

| | Taste (day) | | | | |
|---|---|---|---|---|---|
| Sample | 1 | 4 | 6 | 8 | 10 |
| C | 5.5 | — | 7 | — | 5.5 |
| I | 8 | 6 | 8.5 | 6.5 | 7* |
| II | 7.5 | 8 | 8 | 7.5 | 8 |

*measured after 9 days

Clearly, after 9 or 10 days, the apple slices that were dipped in the preservative solutions still maintained a pleasant taste, whereas the taste of the apple slices that were dipped in the control solution was not good after 10 days. Additionally, after 10 days, said apple slices that were treated with compositions I and II also had a good appearance, smell and texture.

In addition, apple slices treated with preservative composition II have a better taste than those treated with preservative composition I. This is ascribed to preservative composition II comprising substantially no magnesium ions.

Example 2

Solutions I and II, as prepared in Example 1, were used to preserve whole red, yellow and green peppers by dipping those in the preservative solutions for 120 seconds. As a control, whole peppers were dipped for 120 seconds in a control solution C containing only tap water. Afterwards, the peppers were stored at a temperature between 21 and 23° C., i.e. at room temperature. The visual appearance, i.e. the surface texture and gleam, of the bell peppers was assessed after 1, 4 and 6 days. A score from 0 to 10 with half point increments was awarded. The scores were weighted as follows:
>8—looks fresh
>6-≤8—good
>5-≤6—not good, but acceptable
≤5—unacceptable
The test results are shown in table 4.

TABLE 4

Pepper Test Results

| | Appearance (day) | | |
|---|---|---|---|
| Sample | 1 | 4 | 6 |
| C | 9 | 8 | 6 |
| I | 9 | 8.5 | 8 |
| II | 8.5 | 8 | 7 |

After 6 days at room temperature, the peppers that were dipped in preservative solutions I and II had a better appearance, i.e. a smoother and gleamier surface, than the peppers that were dipped in the control solution.

This shows that the preservative compositions and solutions according to the invention are suitably used for the preservation of both fruits and vegetables, sliced and whole, under cooling conditions and at room temperature.

The invention claimed is:

1. A preservative composition comprising a source of ascorbate or erythorbate ions, or a mixture thereof, a source of calcium ions and one or more food grade sequestrants, wherein the molar ratio of ascorbate or erythorbate ions, or a mixture thereof, to calcium ions is of from 0.5:1 to 1.4:1, which preservative composition further contains an alkaline carbonate or bicarbonate salt and a reducing agent, selected from the group consisting of a metabisulfite salt, cysteine and one of its amino acid derivatives, all percentages based on the weight of the total composition, and comprising:
   i) from 4 to 20 wt. % of ascorbic acid;
   ii) from 4 to 20 wt. % of calcium chloride;
   iii) from 5 to 30 wt. % of citric acid;
   iv) from 5 to 50 wt. % of lactose or dextrose;
   v) from 1 to 30 wt. % of sodium bicarbonate;
   vi) from 0.1 to 10 wt. % of sodium metabisulfite;
   vii) from 0.1 to 5 wt. % of potassium citrate;
   wherein all amounts are based on the total weight of the composition.

2. The preservative composition according to claim 1, wherein the source of ascorbate ions is ascorbic acid and the source of erythorbate ions is erythorbic acid.

3. The preservative composition according to claim 1, wherein the source of calcium ions is selected from the group consisting of calcium hydroxide, calcium chloride, calcium carbonate, calcium bicarbonate, calcium phosphate, calcium erythorbate, calcium acetate, calcium gluconate, calcium glycerophosphate, calcium lactate, calcium ascorbate, and mixtures of those.

4. The preservative composition according to claim 3, wherein the source of calcium ions is calcium chloride or calcium carbonate.

5. The preservative composition according to claim 1, wherein the amount of calcium ions is of from 0.5 to 20 wt. %, based on the total composition.

6. The preservative composition according to claim 5, wherein the amount of calcium ions is of from 1 to 15 wt. %, based on the total composition.

7. The preservative composition according to claim 1, wherein the one or more food grade sequestrants are selected from the group consisting of acetic acid, citric acid, fumaric acid, lactic acid, malic acid, glutamic acid, gluconic acid, succinic acid, tartaric acid, and their salts, EDTA and its salts, phosphate salts, polyphosphate salts, bisulfate salts, and mixtures thereof.

8. The preservative composition according to claim 7, wherein the food grade sequestrant is citric acid.

9. The preservative composition according to claim 1 one or more of the preceding claims, wherein the composition is essentially free of magnesium ions.

10. The preservative composition according to claim 1, further comprising a filler material.

11. The preservative composition according to claim 10, wherein the filler material is selected from the group consisting of methylcellulose or one of its derivatives, lactose, dextrose, mannitol, sorbitol, maltitol, rebaudioside A, xylitol, and mixtures thereof.

12. The preservative composition according to claim 1, further comprising one or more cyclodextrins.

13. The preservative composition according to claim 1, comprising:
   i) from 5 to 15 wt. % of ascorbic acid;
   ii) from 5 to 15 wt. % of calcium chloride;
   iii) from 10 to 25 wt. % of citric acid;
   iv) from 10 to 40 wt. % of lactose or dextrose;
   v) from 5 to 20 wt. % of sodium bicarbonate;
   vi) from 1 to 8 wt. % of sodium metabisulfite;
   vii) from 1 to 4 wt. % of potassium citrate;
   wherein all amounts are based on the total weight of the composition.

14. A product holder comprising the preservative composition according to claim 1.

15. The product holder according to claim 14, wherein the product holder is a sachet.

16. A method for preserving produce comprising:
   utilizing the preservative composition according to claim 1 in the sanitization and/or preservation of fruit or vegetables.

17. A method for preserving fruits or vegetables, comprising the steps of:
   a) combining and mixing the ingredients of the preservative composition according to claim 1;
   b) preparing a preservation solution by adding the preservative composition to water;
   c) treating the fruits or vegetables with the preservation solution by contacting them for a predetermined amount of time; and
   d) optionally storing the treated fruit and vegetables at a temperature between 1 and 12° C.

18. Fruits or vegetables treated with the preservative composition according to claim 1.

19. The preservative composition according to claim 1, comprising beta-cyclodextrin.

20. A preservative solution comprising a preservative composition and water, wherein the water is optionally sanitized with a sanitizing agent selected from the group consisting of hydrogen peroxide, chlorine, chlorine dioxide, sodium hypochlorite, ozone, and mixtures thereof, wherein the preservative composition comprises:
   i) from 4 to 20 wt. % of ascorbic acid;
   ii) from 4 to 20 wt. % of calcium chloride;
   iii) from 5 to 30 wt. % of citric acid;
   iv) from 5 to 50 wt. % of lactose or dextrose;
   v) from 1 to 30 wt. % of sodium bicarbonate;
   vi) from 0.1 to 10 wt. % of sodium metabisulfite;
   vii) from 0.1 to 5 wt. % of potassium citrate;
   wherein all amounts are based on the total weight of the composition, and
   wherein the molar ratio of ascorbate or erythorbate ions, or a mixture thereof, to calcium ions is of from 0.5:1 to 1.4:1.

21. The preservative solution according to claim 20, wherein the combined amount of calcium ions, ascorbate and/or erythorbate ions and the one or more food grade sequestrant in the preservative solution ranges of from 0.1 to 10 grams per liter water.

22. The preservative solution according to claim 21, wherein the combined amount of calcium ions, ascorbate and/or erythorbate ions and the one or more food grade sequestrant in the preservative solution ranges of from 0.5 to 5 grams per liter water.

23. The preservative solution according to claim 20, comprising of from 2 to 20 grams of the preservative composition per liter water,
   wherein the preservative composition comprises:
   i) from 5 to 15 wt. % of ascorbic acid;
   ii) from 5 to 15 wt. % of calcium chloride;
   iii) from 10 to 25 wt. % of citric acid;
   iv) from 10 to 40 wt. % of lactose or dextrose;
   v) from 5 to 20 wt. % of sodium bicarbonate;
   vi) from 1 to 8 wt. % of sodium metabisulfite;
   vii) from 1 to 4 wt. % of potassium citrate;
   wherein all amounts are based on the total weight of the composition.

24. A product holder comprising the preservative solution according to claim 20.

25. The product holder according to claim 24 wherein the product holder is a sachet.

26. A method for preserving produce comprising:
   utilizing the preservative solution according to claim 20 in the sanitization and/or preservation of fruit or vegetables.

* * * * *